Patented Jan. 14, 1941

2,228,989

UNITED STATES PATENT OFFICE 2,228,989

ETHERS OF PARTIALLY ESTERIFIED ALKYLOLAMINES

Melvin De Groote, University City, and Bernhard Keiser and Charles M. Blair, Jr., Webster Groves, Mo., assignors, by mesne assignments, to Petrolite Corporation, Ltd., a corporation of Delaware No Drawing. Application May 16, 1938, Serial No. 208,220

14 Claims. (Cl. 260—404)

This invention relates to new products adapted for use as wetting, dispersing or emulsifying agents. It relates more particularly to new ethereal condensation products of partially esterified alkylolamines having at least one esterified hydroxyl group and at least one free hydroxyl group with polyhydric alcohols. Of these products, the ethereal condensation products of partially esterified alkylolamines with glycerin have important advantages. The invention includes not only these new products, but also a new process for their preparation. The new products are quite stable and are highly effective in acid solution.

The new products of the present invention may be represented by the formula:

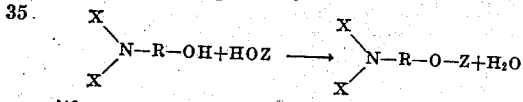

in which R represents an alkyl, aralkyl or alicyclic group and in which the X's represent alkyl, aralkyl, alicyclic, alkylol, hydroxyalicyclic, aralkylol or esterified alkylol, aralkylol or hydroxyalicyclic groups, alike or different; and Z is the residue of a polyhydric alcohol. The radicals represented by X may be indifferently selected, except that at least one must contain an R₄COO substitutent (R₄ representing methyl or the carbon linked chain of a fatty acid).

These new products are advantageously produced by reaction between the corresponding alkylolamine and polyhydric alcohol, in accordance with the equation:

with elimination of water between an OH group of the alkylolamine and an OH group of the polyhydric alcohol, with formation of an ether. This reaction may be caused to take place by heating the constituents together to a temperature in excess of 100° C., advantageously above 150° C. but below the point of decomposition or volatilization of the constituents, for a relatively long period of time, for example, one or two days, with reflux, if desired, to prevent undue volatilization of relatively volatile compounds. A current of inert gas, such as dry nitrogen, may be passed through the reaction mixture to cause the reaction to proceed more rapidly.

The partially esterified alkylolamines used for the preparation of the new products of the present invention may be prepared in various ways. In general, they may be represented by the formula:

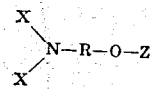

in which $R_1$, $R_2$ and $R_3$ are alkyl groups as herein defined, or substituted alkyl groups, which may be the same or different, at least one of which has at least one R₄COO substituent (R₄ representing methyl or the carbon-linked chain of a fatty acid) and at least one of which has at least one OH (alcoholic hydroxyl) substituent, compounds having an R₄COO substituent, and an OH substituent in the same substituted alkyl group, with the other alkyl groups substituted or unsubstituted, being included.

In this specification, and the appended claims, the term "fatty acid" is used to designate broadly carboxylic acids of the aliphatic series, including both unsaturated and saturated acids as well as the substituted acids which may occur in natural fats or oils, such as ricinoleic acid, and modifications of the acids which occur in natural oils, such as those in blown or bodied oils; and the term "higher fatty acid" is used to designate those carboxylic acids, generally having at least 8 carbon atoms, which occur combined with glycerin in natural oils and fats. It is understood that the terms "alkylol" and "alkyl" are used conventionally in chemistry to refer to paraffin compounds which are non-cyclic and aliphatic in nature. We have found, however, that the alicyclic and hydroxyalicyclic, as well as the aralkyl and aralkylolamines are, with respect to the reactions involved in the various phases of the present invention, similar to the corresponding alkyl and alkylol amines, with the limitation that the aralkyl and aralkylol compounds have the linkage to the nitrogen atom in the side chain. For this reason, for the purpose of describing the present invention only, it is understood that the terms "alkyl" and "alkylol" include within their scope alicyclic, aralkyl, hydroxyalicyclic and aralkylol groups.

One advantageous method of preparing the partially esterified alkylolamines is that described in our application Serial No. 180,993, filed December 21, 1937, by reaction between a triglyceride of a fatty acid, or other ester of a fatty acid, and an alkylolamine having more than one alcoholic hydroxyl, the proportions of the ester and the alkylolamine being such that after replacement of the glycerin or other alcohol of the fatty acid ester used, there will be at least one free alcoholic hydroxyl in the esterified alkylolamine. Such alkylolamines, having at least one esterified hydroxyl group and at least one free hydroxyl group, are herein referred to as "partially esterified alkylolamines." The free alcoholic hydroxyl of the partially esterified amine is available for condensation with a corresponding hydroxyl group of a polyhydric alcohol in accordance with the present invention. However, the preparation of the partially esterified alkylolamines which may be used is not limited to the procedure described in said prior application, as they may also be prepared by suitable reaction between an acyl halide, such as acyl chloride, and a tertiary alkylolamine, or in other ways. Also, it is to be understood that the alkylolamines used in accordance with the present invention need not be esters of tertiary alkylolamines with the higher fatty acids, but include tertiary alkylolamines partially esterified with the lower fatty acids, such as acetic acid, propionic acid, butyric acid, etc.

Similarly, various polyhydric alcohols, including ethylene glycol, propylene glycol, glycerin, polyglycerols, polyglycols, etc., may be used in the preparation of the new ethers. The products obtained by the condensation of partially esterified alkylolamines with glycerin have important advantages, and are the preferred compounds.

If the reaction described in our prior application Serial No. 180,993 is carried out for the production of the partially esterified alkylolamines, the alcoholysis which takes place will result in the formation of a partially esterified alkylolamine, with liberation of glycerin and formation of a reaction mixture suitable for the production of new ethers of the present invention. When using such a product, it is advantageous to add more glycerin, after the substantial completion of the alcoholysis and formation of the partially esterified alkylolamine and liberation of glycerin, to promote the reaction involved in the production of the new ethers, and to provide either equimolecular proportions of amine and glycerin, or an excess of glycerin.

Among the amines which may be partially esterified for use in the production of the new products of the present invention are a wide range of tertiary alkylol and tertiary alkyl alkylolamines. The two essentials are that the alkylolamine contain at least two alcoholic hydroxyl groups, which may be attached to the same or different carbon chains, and be a tertiary amine, that is, with three alkyl or alkylol groups linked through carbon atoms to the nitrogen atom. Included among the suitable amines are triethanolamine, diethanolalkylamines, such as diethanolethylamine, diethanolpropylamine, etc., tertiary glyceryl amines, such as tri-dihydroxypropylamine, dihydroxypropyldialkylamines, such as dihydroxypropyldiethylamine, tripropanolamine, dipropanolmethylamine, cyclohexanoldiethanolamine, di-cyclohexanolethylamine, etc. All such products may be readily prepared by known processes, and all of them are tertiary amines having at least two alcoholic hydroxyl groups, thus being adapted to form esters with higher fatty acids, such esters having at least one free hydroxyl group. Typical of the amines which may be used are the following:

$(C_2H_4OH)_3N$
Triethanolamine $(C_2H_4OH)$
$(C_2H_4OH)-N$
$(C_2H_5)$
Diethanolethylamine $(C_2H_4OH)$
$(C_2H_4OH)-N$
$CH_3$
Diethanolmethylamine $[C_3H_5(OH)_2]_3N$
Tri-dihydroxypropylamine (triglycerylamine)

$[C_3H_5(OH)_2]$
$[C_3H_5(OH)_2]-N$
$(C_2H_5)$
Di-dihydroxypropylethylamine (diglycerylethylamine)

$[C_3H_5(OH)_2]$
$(C_2H_5)-N$
$(C_2H_5)$
Dihydroxypropyldiethylamine (glyceryl diethylamine)

$(C_3H_6OH)_3N$
Tripropanolamine $(C_3H_6OH)$
$(C_3H_6OH)-N$
$(C_2H_5)$
Dipropanolethylamine $[C_3H_5(C_6H_5)OH]$
$[C_3H_5(C_6H_5)OH]-N$
$(C_2H_5)$
Di-phenylpropanolethylamine $(C_2H_4OH)$
$(C_2H_4OH)-N$
$(C_6H_{10}OH)$
Cyclohexanoldiethanolamine $(C_6H_{10}OH)$
$(C_6H_{10}OH)-N$
$(C_2H_5)$
Dicyclohexanolethylamine $(C_4H_8OH)_3N$
Tributanolamine $(C_4H_8OH)$
$(C_4H_8OH)-N$
$(C_2H_4OH)$
Dibutanolethanolamine $(C_4H_8OH)$
$(C_4H_8OH)-N$
$CH_3$
Dibutanolmethylamine These tertiary alkylolamines, and others, may be partially esterified with fatty acids for use in the production of the new compositions of the present invention. Thus these tertiary alkylolamines may be partially esterified with such fatty acids as acetic acid, propionic acid, butyric acid, etc., or with the higher fatty acids, such as those occurring combined with glycerin in such vegetable oils as cocoanut and palm kernel oil, olive oil, castor oil, palm oil, peanut oil, the drying and semi-drying oils such as corn oil, rapeseed oil, soya bean oil, sunflower seed oil, linseed oil, Perilla oil, etc., as well as animal and marine oils, such as tallow, sardine oil, menhaden oil, etc. The fatty acids derived from blown or bodied oils, such as blown castor oil, blown rapeseed oil or Perilla oil, bodied linseed oil, etc., may also be used, products so derived having somewhat different properties from those derived from the original oils. Tertiary alkylolamines partially esterified with fatty acids from castor oil and blown castor oil have somewhat special characteristics due to the presence of oxygen in the long hydrocarbon chain characteristic of such fatty acids.

If glycerin, or other polyhydric alcohol having more than two free hydroxyl groups, or a partially esterified alkylolamine having more than one free alcoholic hydroxyl group be used in the production of the new products, more complex condensation products may be produced in the course of the reaction, as by the condensation of one molecule of the partially esterified alkylolamine having more than one free hydroxyl group with two molecules of the polyhydric alcohol, or by the condensation of one molecule of the polyhydric alcohol with two or more molecules of the partially esterified alkylolamine. In any case, the resulting condensation products are ethereal derivatives of the initial starting material.

The invention will be further illustrated by the following specific examples, although it is not limited thereto.

*Example 1.*—Commercial triethanolamine and cocoanut oil, in the proportions of 1 mole of cocoanut oil to 3 moles of triethanolamine are heated to a temperature between about 160° C. and 180° C. for about two hours. The resulting product consists mainly of the mono-fatty acid ester of triethanolamine, with minor proportions of the di-fatty acid ester, the tri-fatty acid ester, glycerin, etc. To this reaction product is added somewhat more than 2 moles of glycerin, and the resulting mixture is heated to a temperature between about 160° C. and 180° C. for about two days. If desired, a current of dry nitrogen or other inert gas may be passed through to speed up the reaction. Condensation occurs between the fatty acid ester of the triethanolamine, and the glycerin, with the production of ethereal reaction products, such as the dihydroxypropyl ether of the mono-fatty acid ester of triethanolamine and other more complex ethereal reaction products.

The final product has extremely good wetting, emulsifying and detergent properties and is highly effective in acid solution.

*Example 2.*—Triglycerylamine (tri-dihydroxypropylamine) and castor oil are reacted in the proportions of 3 moles of castor oil to 2 moles of triglycerylamine, with the production of a product consisting predominantly of the di-ricinoleic acid ester of the triglycerylamine. The resulting mixture is further heated for a period of about two days, with condensation between the glycerin and the di-ricinoleic acid ester of the triglycerylamine, and the production of corresponding ethereal condensation products.

*Example 3.*—Blown rapeseed oil and diethanolethylamine, in the molecular proportions of 3 moles of the amine to 1 mole of the oil are heated together to a temperature between about 150° C. and 180° C. for about two hours, with the production of a reaction product containing a large proportion of the mono-ester of the diethanolethylamine, together with unreacted starting material, glycerin, etc. Something in excess of two moles of glycerin are added to the reaction mixture, and the resulting product is heated to about 150° C. to 180° C. for about two days, with the production of ethereal reaction products of glycerin and the mono-ester of the diethanolethylamine.

The foregoing examples illustrate the production of certain of the new products of the present invention. In place of the partially esterified tertiary alkylolamines of the examples, any other available tertiary alkylolamine having at least one esterified hydroxyl group and at least one free hydroxyl group, such as the products obtained by the partial esterification of the polyhydroxyalkylolamines previously referred to may be used; while in place of the glycerin of the examples, other polyhydric alcohols, such as ethylene glycol, propylene glycol, etc., may be used. In general, ethers derived from glycerin and the partially esterified tertiary alkylolamines, particularly the mono- and di-fatty acid esters of triethanolamine, have important advantages as wetting, dispersing and emulsifying agents.

We claim:

1. Ethers of partially esterified tertiary alkylolamines with polyhydric alcohols.

2. Ethers of partially esterified tertiary alkylolamines with glycerin.

3. Ethers of partially esterified triethanolamines with polyhydric alcohols.

4. Ethers of partially esterified triethanolamines with glycerin.

5. Ethers of mono-fatty acid esters of tertiary alkylolamines having more than one hydroxy group with polyhydric alcohols.

6. Ethers of mono-higher fatty acid esters of tertiary alkylolamines having more than one hydroxy group with polyhydric alcohols.

7. Ethers of mono-fatty acid esters of triethanolamine with polyhydric alcohols.

8. Ethers of mono-fatty acid esters of triethanolamine with glycerin.

9. Ethers of mono-higher fatty acid esters of triethanolamine with glycerin.

10. Reaction products of partially esterified tertiary alkylolamines and polyhydric alcohols, said reaction products having an ether linkage.

11. Reaction products of compounds of the class consisting of mono- and di-fatty acid esters of triethanolamine and glycerin, said reaction products having an ether linkage.

12. The process of preparing wetting, emulsifying and dispersing agents, which comprises heating a partially esterified tertiary alkylolamine with a polyhydric alcohol to a temperature in excess of 100° C. for a period of time sufficient to cause condensation with elimination of water and the production of a reaction product having an ether linkage.

13. The process as in the preceding claim in which a current of inert gas is passed through the reaction mixture.

14. The process as in claim 12 when carried out at a temperature between about 150° C. and 180° C.

MELVIN DE GROOTE.
BERNHARD KEISER.
CHARLES M. BLAIR, JR.